Figure 1:
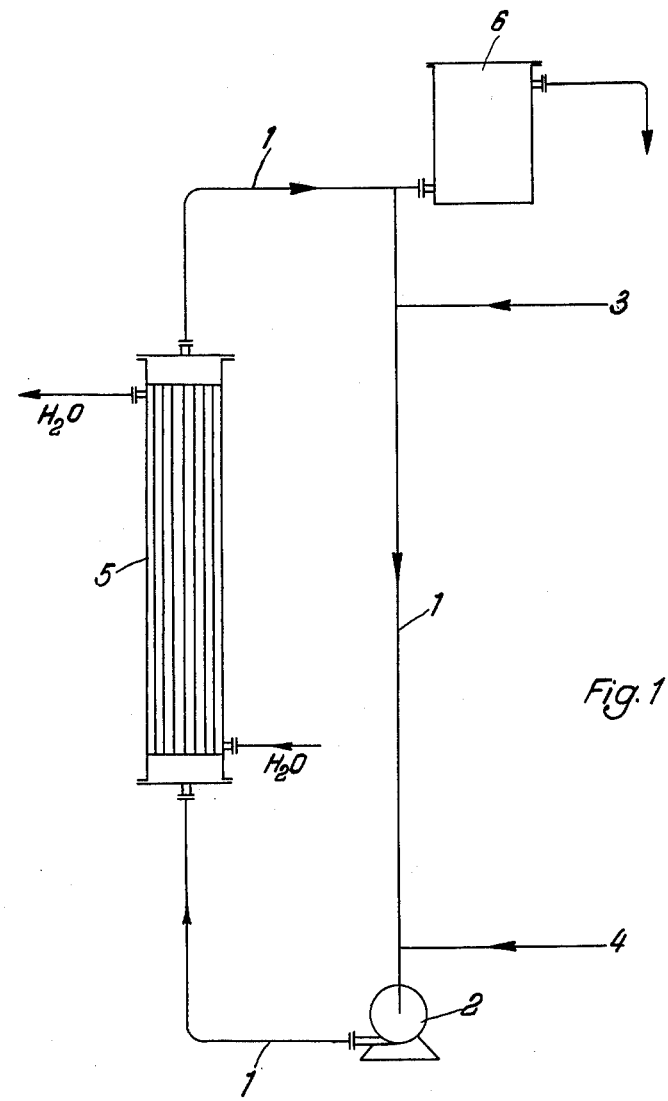

3,065,268
**PREPARATION OF CONCENTRATED ACETO-
ACETAMIDE SOLUTIONS**
Pierre Mathey, Geneva, Switzerland (10 Schinnerstrasse, Brig, Switzerland), and Christoph Zinsstag, Visp, Switzerland
Filed Oct. 2, 1958, Ser. No. 764,857
Claims priority, application Switzerland Oct. 3, 1957
6 Claims. (Cl. 260—561)

The invention relates to the preparation of acetoacetamide solutions.

It is known to prepare acetoacetamide by reacting ammonia with diketene in aqueous solution at temperatures below 50° C.

Because of the great reactivity of the starting materials and the heat developed during the reaction, the reaction is carried out in dilute solution and at temperatures below 15° C. in order to avoid undesired side reactions. However in this way, solutions containing at most 30 percent of acetoacetamide can be obtained. The recovery of the acetoacetamide from such dilute solutions is very difficult, due to its high solubility and ready decomposition on evaporation.

It is a principal object of the invention to provide a method of preparing acetoacetamide solutions having an acetoacetamide content of more than 40 percent.

It is another object of the invention to provide a method of preparing acetoacetamide at temperatures which allow to take advantage of the high reaction rate, without incurring substantial side reactions.

Other objects and advantages will be apparent from a consideration of the specification and claims.

We have found that it is possible to prepare concentrated aqueous solutions containing more than 40 and up to 85 percent, preferably 50 to 70 percent, of acetoacetamide by passing diketene, ammonia, water or ammonia water, to which ammonia gas may be added, at a temperature of 20 to 60° C., preferably 25 to 40° C., into an aqueous acetoacetamide solution having an acetoacetamide content of at least 35 and up to 85 percent acetoacetamide, and the resulting yield-reducing side reactions.

We prefer to carry out the reaction in an acetoacetamide solution of about the same concentration as the concentration of the solution to be prepared. This is readily done by adjusting the ratios of the reactants so as to form an acetoacetamide solution of the desired concentration.

In order to prevent any side reactions, diketene, ammonia and water or ammonia water are added to the acetoacetamide solution under such conditions that the heat of reaction increases the temperature of the reaction mixture by at most 20° C., preferably by not more than 5 to 10° C. This heat can be removed from the mixture by appropriate cooling.

Diketene, ammonia and water may be introduced separately, or the ammonia and water may be added in the form of ammonia water of for example 15–20 percent $NH_3$ content. For the preparation of high concentrated acetoacetamide solutions, it may be of advantage to use superconcentrated ammonia solutions, having an $NH_3$ content of up to 50 percent, or gaseous ammonia in addition to aqueous ammonia solution.

Thorough mixing of the reactants with the acetoacetamide solution is necessary to prevent local overheating and the resulting yield-reducing side reactions.

On extended exposure to the elevated operating temperatures, the acetoacetamide solution may show a tendency to decompose; we prefer therefore, to adjust the addition of the reactants so as to replace completely, after a certain time, for example the mean residence time should not exceed 100 minutes, the acetoacetamide solution serving as reaction medium. For instance in the temperature rang of 25–30° C. the mean residence time of the actoacetamide solution should be not more than preferably 2–30 minutes.

The residence time is calculated according to the equation $$\text{Residence time in minutes} = \frac{\text{volume of total circulating liquid}}{\text{volume per minute of liquid withdrawn}}$$

The reactants are introduced preferably at least in stoichiometrical amount, still preferably the $NH_3$ amount should be in excess of the stoichiometrically calculated amount by 0.5–20 percent, most favorably 3–5 percent. The excess of ammonia allows for improved stabilisation of the acetoacetamide in the solution. The solution withdrawn from the reaction zone has a pH of 8.5–10.5 and still better from 9–9.5.

Our method is particularly suitable for continuous operation. An apparatus suitable for such continuous operation is diagrammatically shown, by way of example, in the accompanying drawings, wherein FIG. 1 shows a plant for separate introduction of diketene and ammonia water into a circulating solution of acetoacetamide, and FIG. 2 shows a plant similar to FIG. 1 including means for introducing gaseous ammonia.

Figure 2:
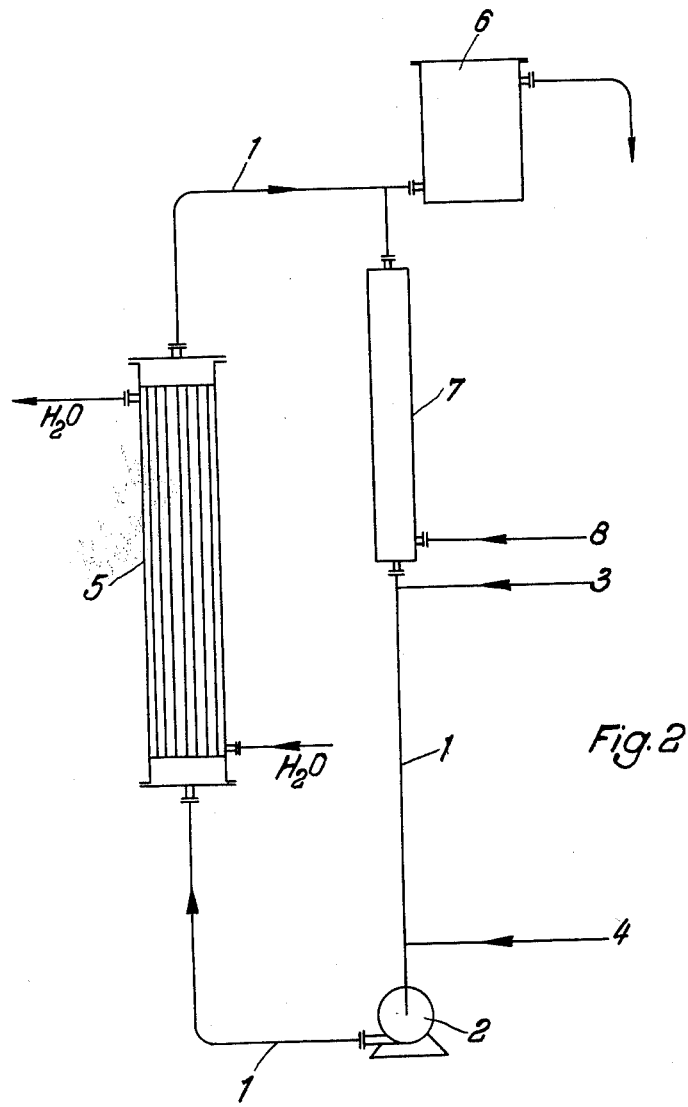

Referring to FIG. 1, the apparatus comprises a recycling conduit 1, a pump 2, a pipe 3 for introducing ammonia water and a pipe 4 for diketene, a water-cooled cooler 5 and an overflow vessel 6. FIG. 2 shows, in addition, an absorber 7 with an inlet 8 for gaseous ammonia.

The apparatus is operated as follows: An acetoacetamide solution of the desired concentration is circulated by the pump 2. Prior to its entry in the cooler, a concentrated ammonia solution is entered through pipe 3 into the cycle. The water content of said ammonia solution controls the acetoacetamide content of the solution. If high concentrated acetoacetamide solutions are to be produced, gaseous ammonia is added through pipe 8 into the absorber 7. After the ammonia has been evenly distributed in the circulating acetoacetamide solution, diketene is admitted to the cycle through conduit 4. The reaction starts immediately with strong heat development. The developed heat is removed in the large surface cooler 5. At the exit end of the cooler, the reaction is substantially terminated. Part of the acetoacetamide solution is passed into the overflow vessel 6, from which acetoacetamide solution is withdrawn in an amount corresponding to the added amounts of reaction components; the remaining portion of the solution is returned to the cycle.

The invention is further illustrated by the following examples:

*Example 1*

An apparatus is used as shown in FIG. 1, which has a total volume of 1.5 liters and wherein the pump has an output of 0.6 m.³/hour. Diketene of 95.5% concentration and aqueous ammonia of 25% concentration are introduced at a rate of 4.8 liters and 6.7 liters per hour, respectively. The temperature is maintained by water cooling at 25° C. The addition of the ammonia may be controlled by means of the pH value in the outlet; preferably, the pH value is adjusted to 9.5 to 10.

There are obtained 10.25 liters per hour of an acetoacetamide solution having a specific gravity of $1.125_{20}$ and containing 56.4 percent by weight of acetoacetamide. The residence time is 8.8 minutes. The yield is 93 percent, calculated on diketene.

*Example 2*

An apparatus similar to that of the preceding example is used, which has a total volume of 7.5 liters; the pump has an output of 2 m.³/hour and the water cooler a surface of 1 sq. m.

97.5% diketene and 25% aqueous ammonia are introduced at a rate of 50 and 68 liters per hour, respectively. The temperature is maintained by water cooling at 25 to 35° C. The pH value during the reaction is adjusted to 9.3.

There are obtained 103 liters/hour of acetoacetamide solution ($d=1.1_{20}$) having a concentration of 51.3 percent by weight, which corresponds to a yield of 58 kg./hour of 100% acetoacetamide and 95 percent, calculated on diketene. The residence time is 4.3 minutes.

*Example 3*

The apparatus of Example 2 is supplemented by an absorber (FIG. 2) and contains 8.5 liters of circulating liquid. To said liquid, there are added 36 liters/hour of 97.5% diketene and 12 liters/hour of 25% aqueous ammonia. In addition, 12.9 m.³/hour of ammonia gas are introduced into the absorber.

The temperature is maintained by cooling water at 25–30° C. The pH value is adjusted to 9.5. There are produced 48.2 liters/hour of a 79.3% acetoacetamide solution. The residence time is 10.5 minutes. The yield, calculated on diketene, is 95.5 percent.

We claim:

1. In the process for preparation of acetoacetamide from ammonia and diketene at a temperature of about 20 to 60° C. the improvement which consists in circulating an aqueous acetoacetamide solution containing about 35 to 85 percent by weight of acetoacetamide, introducing continuously first ammonia and water and then diketene into said circulating solution, thereby forming fresh acetoacetamide, continuously withdrawing part of said solution, and adjusting the rate of withdrawal so that the mean residence time of said freshly formed acetoacetamide in said cycle does not exceed 100 minutes.

2. The method as claimed in claim 1 wherein ammonia and water are introduced as an aqueous ammonia solution.

3. The method as claimed in claim 1 wherein ammonia is introduced as gas.

4. The method as claimed in claim 1 wherein the amounts of the reactants are so adjusted as to produce an acetoacetamide solution of substantially the same concentration as the concentration of the acetoacetamide solution used as reaction medium.

5. The method as claimed in claim 1 wherein the temperature increase during the reaction is maintained below about 20° C. by cooling.

6. The method as defined in claim 1 wherein the temperature is maintained at about 25 to 30° C. and the mean residence time of said acetoacetamide is adjusted to 2 to 30 minutes.

References Cited in the file of this patent

UNITED STATES PATENTS

| | | |
|---|---|---|
| 2,089,945 | Converse et al. | Aug. 17, 1937 |
| 2,152,132 | Boese | Mar. 28, 1939 |
| 2,174,239 | Gleason | Sept. 26, 1939 |
| 2,615,917 | Mueller | Oct. 28, 1952 |
| 2,863,888 | Shurman | Dec. 9, 1958 |